United States Patent
Barnas et al.

(10) Patent No.: US 10,369,484 B2
(45) Date of Patent: Aug. 6, 2019

(54) UNIVERSAL ELECTRONIC CABLE AND CORD ORGANIZATION, MANAGEMENT AND STORAGE DEVICE WITH MULTIPLE DESIGN CONFIGURATIONS AND PERMUTATIONS

(71) Applicant: Paradigm Sourcing, LLC, Tolland, CT (US)

(72) Inventors: Hollie Barnas, Tolland, CT (US); David Barnas, Tolland, CT (US)

(73) Assignee: Paradigm Sourcing, LLC, Tolland, CT (US)

( * ) Notice: Subject to any disclaimer, the term of this patent is extended or adjusted under 35 U.S.C. 154(b) by 140 days.

(21) Appl. No.: 15/203,900

(22) Filed: Jul. 7, 2016

(65) Prior Publication Data
US 2017/0018914 A1    Jan. 19, 2017

Related U.S. Application Data

(60) Provisional application No. 62/231,621, filed on Jul. 13, 2015.

(51) Int. Cl.
*A63H 3/00*         (2006.01)
*B65H 75/06*        (2006.01)
(Continued)

(52) U.S. Cl.
CPC .............. *A63H 3/003* (2013.01); *B65H 75/06* (2013.01); *B65H 75/28* (2013.01); *H02G 11/02* (2013.01); *B65H 2701/3919* (2013.01)

(58) Field of Classification Search
CPC ........ B65H 75/06; B65H 75/28; B65H 75/40; B65H 2701/3919; H02G 3/083; A63H 3/003; F16L 3/26
(Continued)

(56) References Cited

U.S. PATENT DOCUMENTS 479,509 A    7/1892 Heaphy, Jr.
1,485,266 A   2/1924 Hennah
(Continued)

OTHER PUBLICATIONS http://www.amazon.com/Mi-Cable-Tidy-Green-Smartphone/dp/B00C3OFM3G.
http://www.instructables.com/id/Octopus-cable-organiser/.
http://www.aliexpress.com/item/high-quality-Slicone-Rubber-Winder-Fish-Bone-Earphone-Cord-Animal-Cable-Winder-Cable-Holder-Organizer-for/1097557324.html.

*Primary Examiner* — Michael R Mansen
*Assistant Examiner* — Mark K Buse
(74) *Attorney, Agent, or Firm* — UConn IP Law Clinic; Matthew Adams Johnson; David Spalding

(57) ABSTRACT

A cord management device is provided and includes a first section, wherein the first section includes two top portion second openings configured to receive one or more blades of an electrical plug and a top portion third opening configured to receive at least one of a USB plug and a blade of the electrical plug. The two top portion second openings are located to represent eyes of the animal and/or cartoon figure and the top portion third opening is located to represent a mouth of the animal and/or cartoon figure. A third section is provided and includes a curvilinear structure shaped to represent a tail of the animal and/or cartoon figure. A second section is provided and located between the first section and the third section, wherein the second section includes one or more second section top protrusions and/or one or more bottom protrusions.

6 Claims, 14 Drawing Sheets

(51) Int. Cl.
*B65H 75/28* (2006.01)
*H02G 11/02* (2006.01)

(58) Field of Classification Search
USPC .......................................... 439/369; 248/49
See application file for complete search history.

(56) References Cited

U.S. PATENT DOCUMENTS

| | | | | |
|---|---|---|---|---|
| 1,901,050 | A * | 3/1933 | Voorhees | B63B 21/04 |
| | | | | 242/405.2 |
| 2,533,341 | A | 12/1950 | Alfano | |
| 2,825,952 | A | 3/1958 | Van Driel | |
| 3,901,458 | A * | 8/1975 | Kuncz, Jr. | A01K 89/08 |
| | | | | 242/405.2 |
| 3,924,819 | A | 12/1975 | Lapinskas | |
| 4,123,012 | A * | 10/1978 | Hough | B65H 75/06 |
| | | | | 242/405.2 |
| 4,193,563 | A * | 3/1980 | Vitale | B65H 75/06 |
| | | | | 242/388.5 |
| 4,195,807 | A | 4/1980 | Llauge | |
| 4,261,529 | A * | 4/1981 | Sandberg | B63B 35/817 |
| | | | | 242/405.2 |
| D272,887 | S | 3/1984 | Parton | |
| D275,262 | S | 8/1984 | Kimball | |
| 4,779,816 | A | 10/1988 | Varlet | |
| 5,139,208 | A * | 8/1992 | Schooley | B65H 75/06 |
| | | | | 211/194 |
| 5,141,192 | A | 8/1992 | Adams | |
| 5,423,693 | A | 6/1995 | Light | |
| D372,188 | S | 7/1996 | Van Dyke | |
| 6,142,405 | A * | 11/2000 | Black | B65H 75/06 |
| | | | | 242/388.6 |
| 6,142,451 | A * | 11/2000 | Lindsey | B65H 75/06 |
| | | | | 242/405.1 |
| 6,360,899 | B1 * | 3/2002 | Smith | B29C 45/2701 |
| | | | | 206/420 |
| D459,199 | S * | 6/2002 | Soroka | D8/360.1 |
| 6,499,781 | B1 | 12/2002 | Flynn | |
| D505,616 | S | 5/2005 | Wingerter | |
| 6,962,306 | B2 * | 11/2005 | West | B65C 31/06 |
| | | | | 242/405.2 |
| D522,849 | S | 6/2006 | Dick | |
| D531,889 | S | 11/2006 | Woltmann | |
| D559,103 | S * | 1/2008 | Van Handel | D9/415 |
| 7,446,260 | B2 | 11/2008 | Hammonds | |
| D584,132 | S | 1/2009 | Judd | |
| D587,988 | S | 3/2009 | Johansson | |
| 7,651,047 | B2 * | 1/2010 | Peng | B65H 75/04 |
| | | | | 242/118.4 |
| 7,661,623 | B2 * | 2/2010 | Peng | B65H 75/04 |
| | | | | 242/118.4 |
| 8,960,584 | B1 * | 2/2015 | Fearon | B65H 75/285 |
| | | | | 242/400.1 |
| 2006/0237574 | A1 * | 10/2006 | Weatherill | B65H 75/403 |
| | | | | 242/403 |
| 2011/0101146 | A1 * | 5/2011 | Bordignon | B65H 75/06 |
| | | | | 242/405.2 |
| 2011/0272517 | A1 * | 11/2011 | Motta | B65H 75/285 |
| | | | | 242/472.7 |
| 2012/0128193 | A1 * | 5/2012 | Stevinson | H04R 1/1033 |
| | | | | 381/384 |
| 2013/0119181 | A1 * | 5/2013 | Fan | B65H 75/241 |
| | | | | 242/400.1 |
| 2013/0168478 | A1 * | 7/2013 | Holman | B65H 75/06 |
| | | | | 242/118 |
| 2014/0014785 | A1 | 1/2014 | Lee | |
| 2014/0306015 | A1 * | 10/2014 | Jackson | H04R 1/1033 |
| | | | | 235/492 |
| 2016/0066076 | A1 * | 3/2016 | Schatt | H04R 1/1033 |
| | | | | 24/122.3 |
| 2016/0242564 | A1 * | 8/2016 | Cass | A47C 31/00 |
| 2016/0297584 | A1 * | 10/2016 | Bicknell | B65D 63/14 |
| 2017/0029239 | A1 * | 2/2017 | Xu | B65H 75/4473 |
| 2017/0030386 | A1 * | 2/2017 | Vecchione | A44B 99/00 |
| 2017/0081145 | A1 * | 3/2017 | Cayton | H04R 1/1033 |
| 2017/0101288 | A1 * | 4/2017 | Einck | B65H 75/06 |

\* cited by examiner

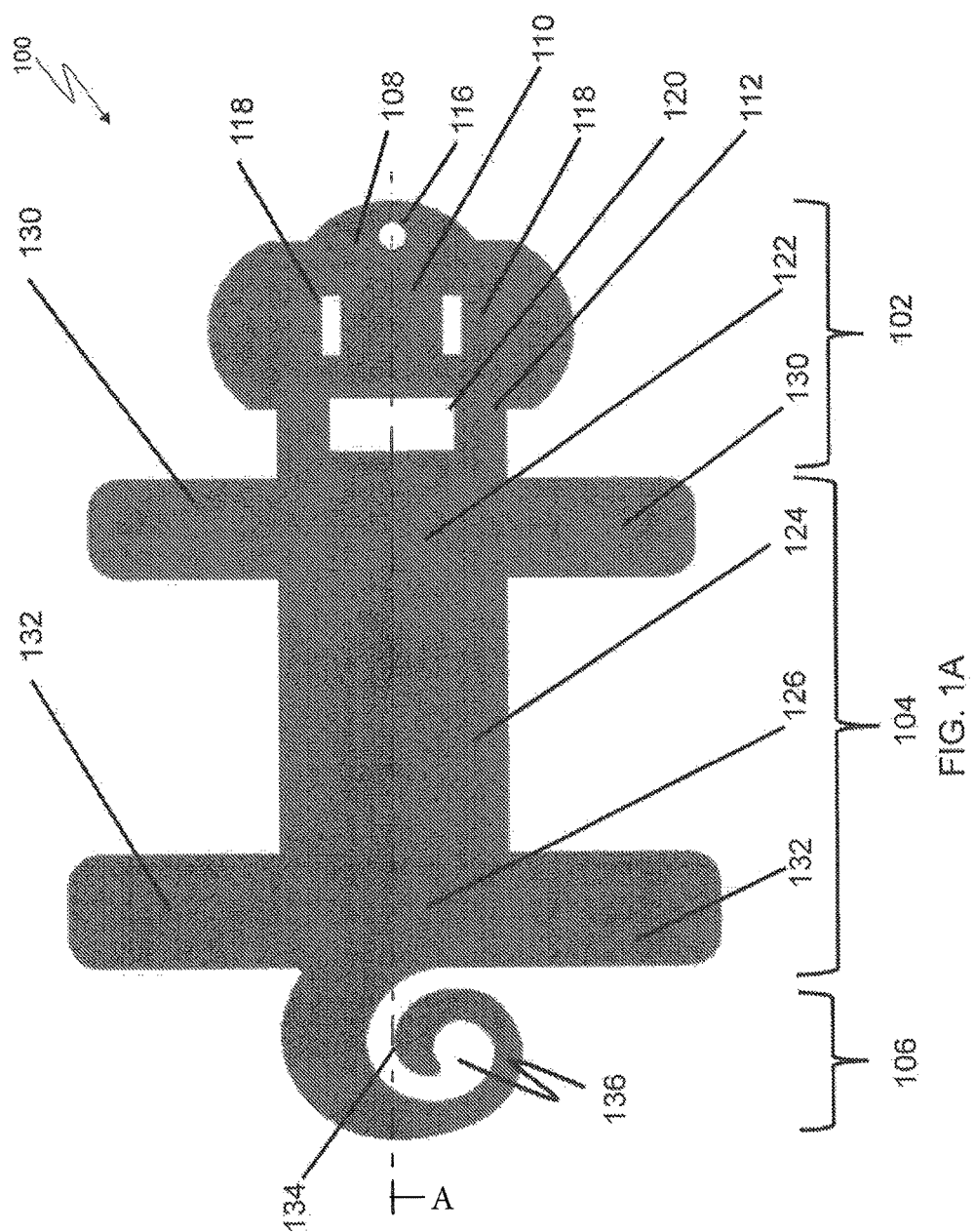

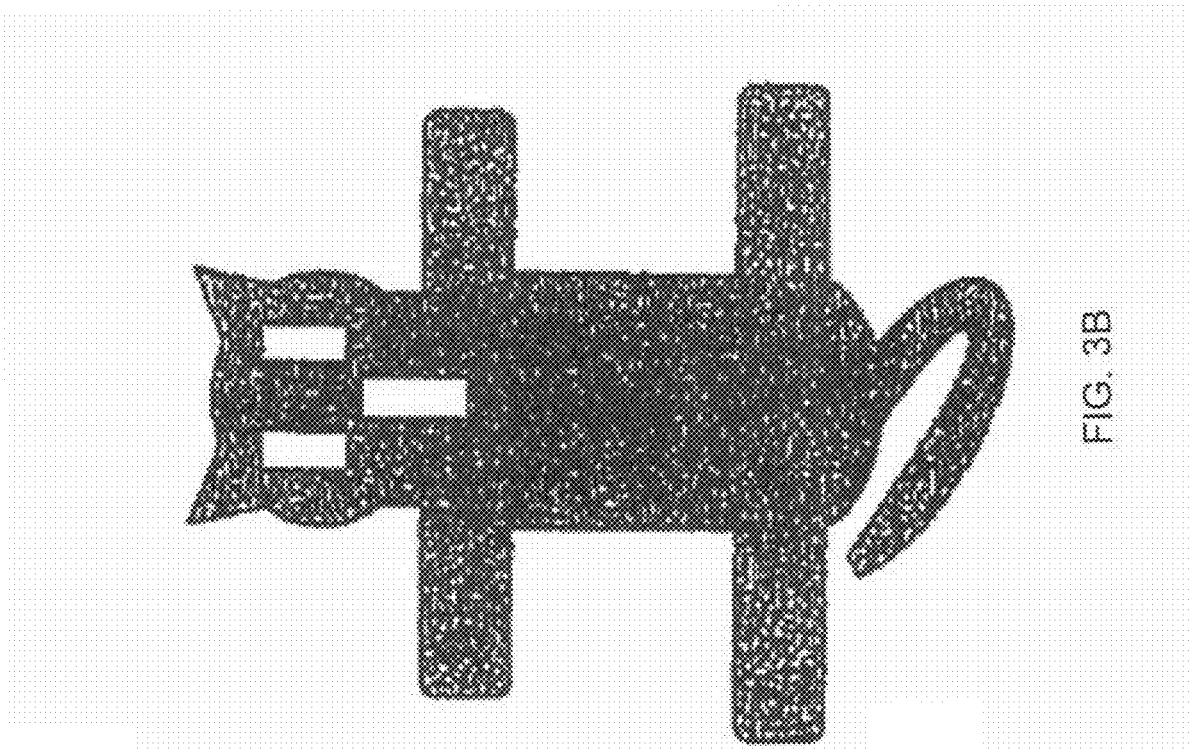
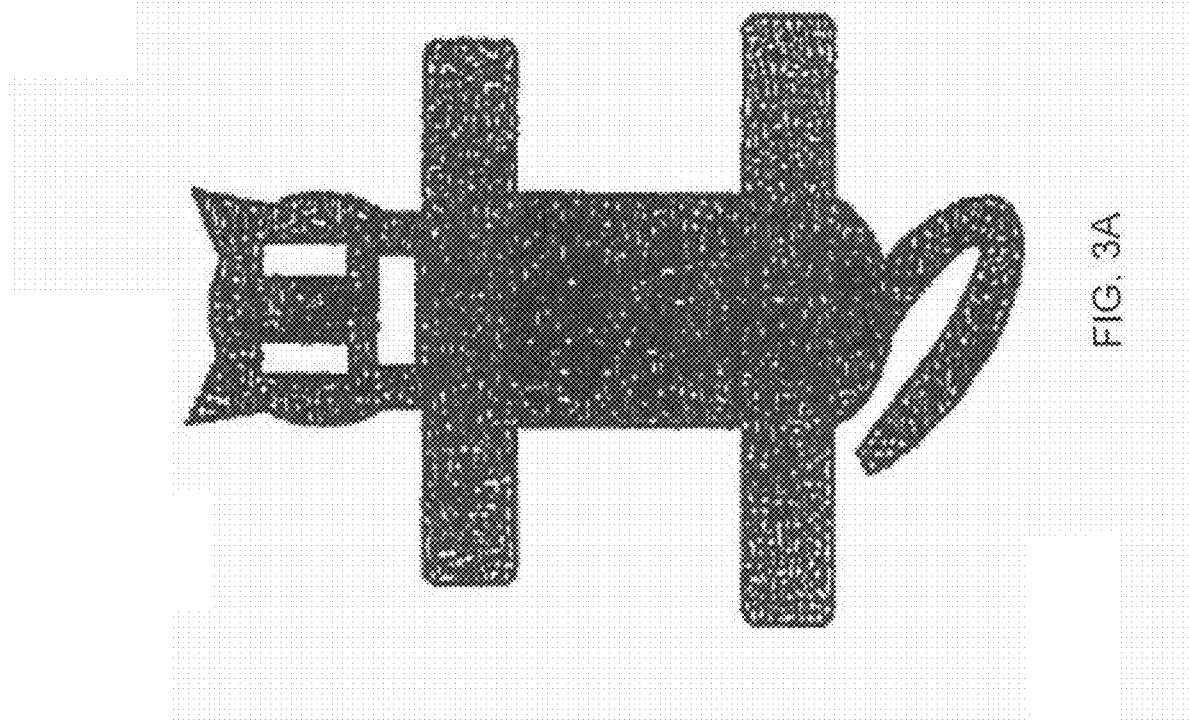

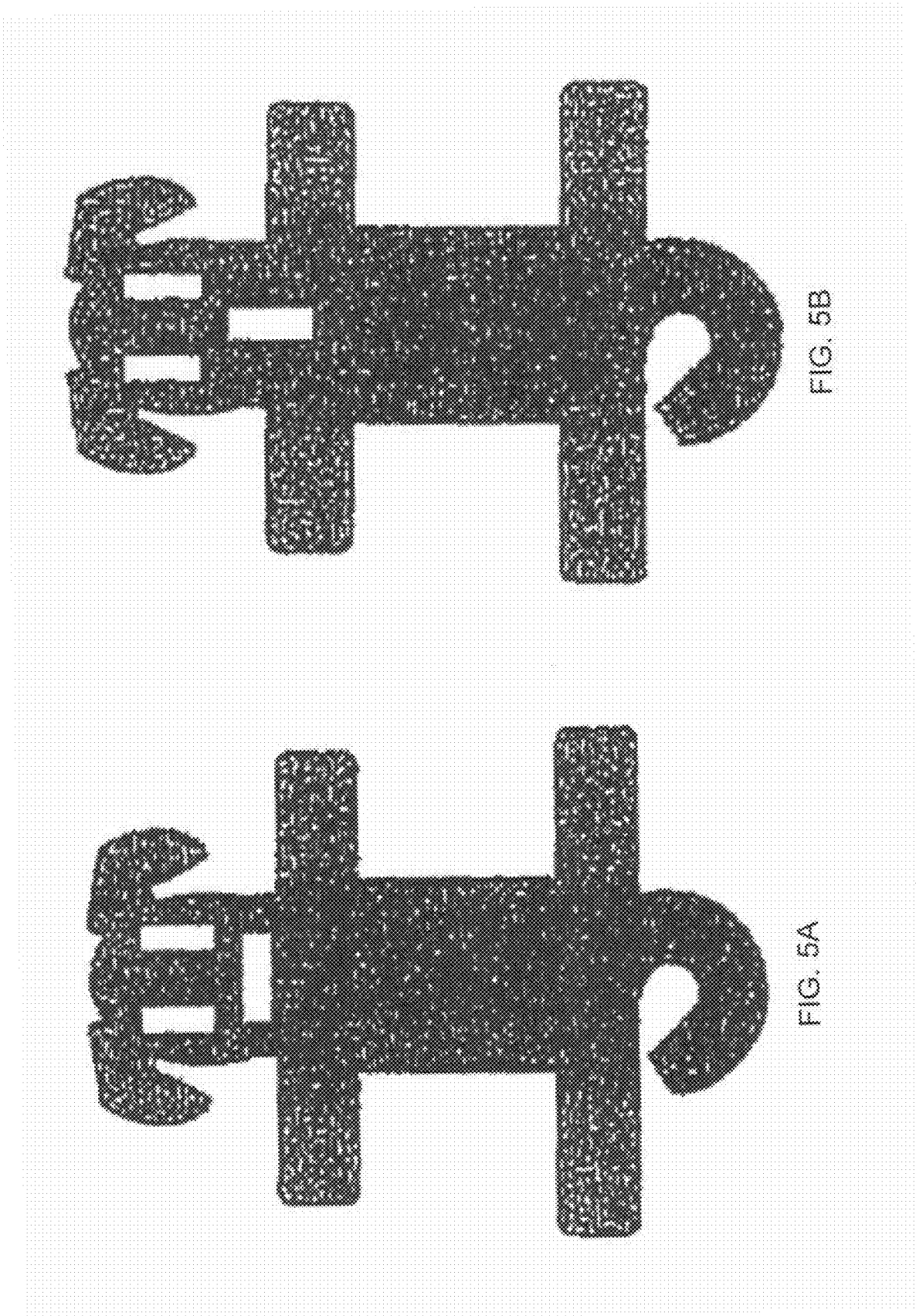

FIG. 6A
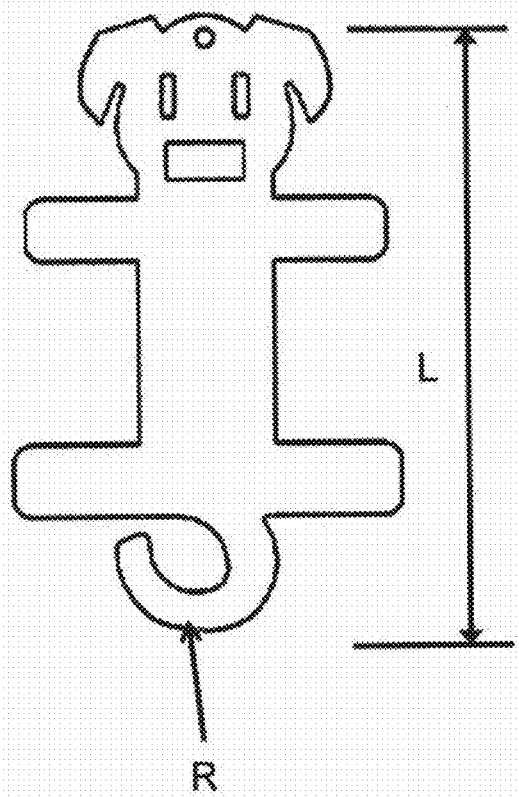
R
L
FIG. 6B
FIG. 6C
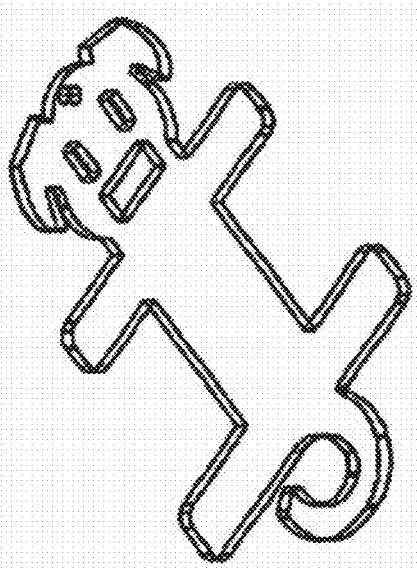
FIG. 6D

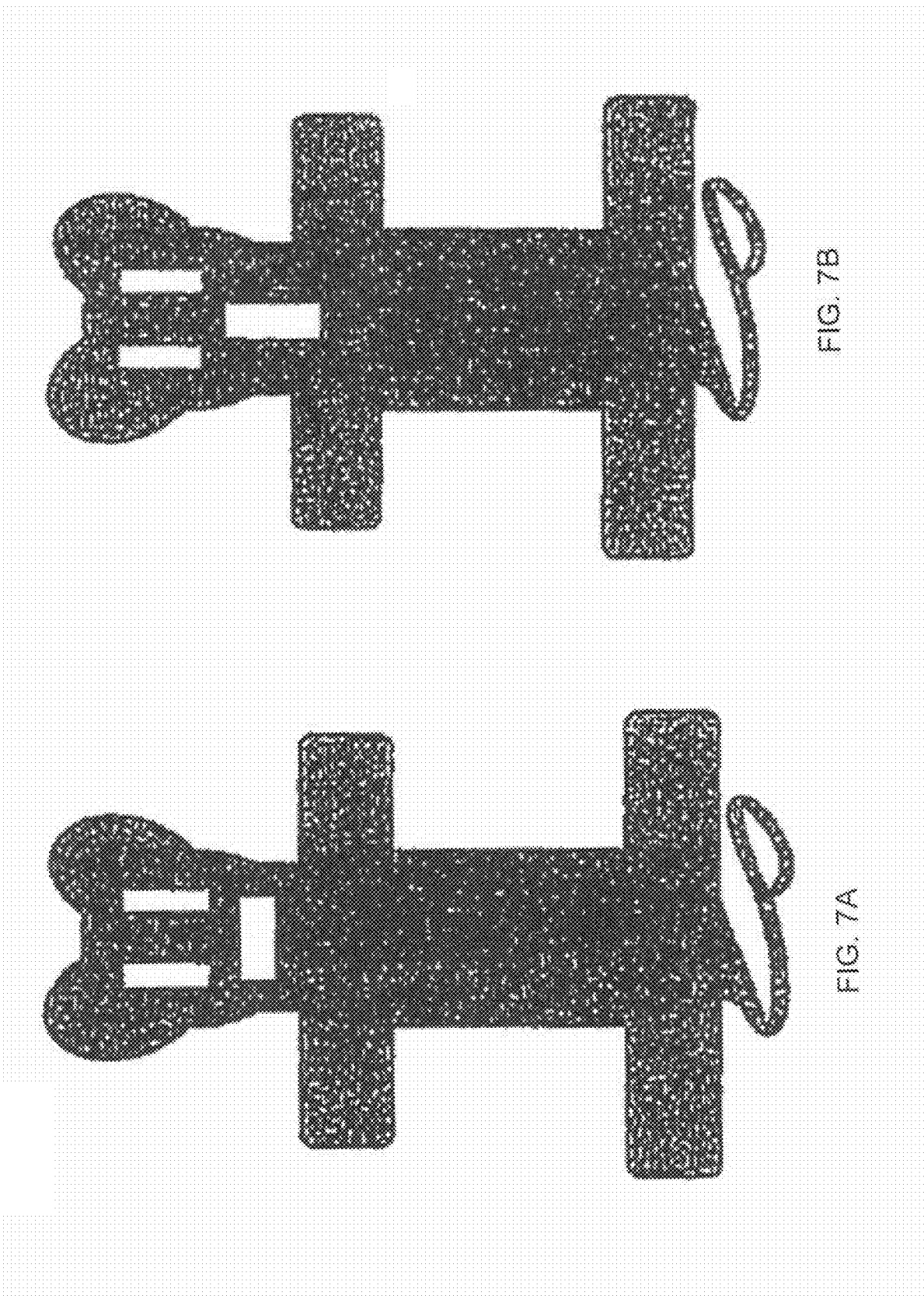

FIG. 8A
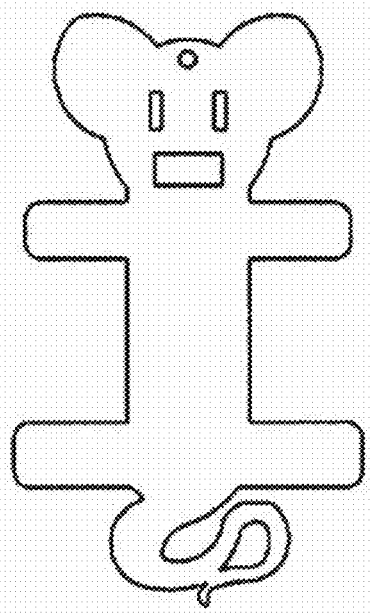
FIG. 8B
FIG. 8C
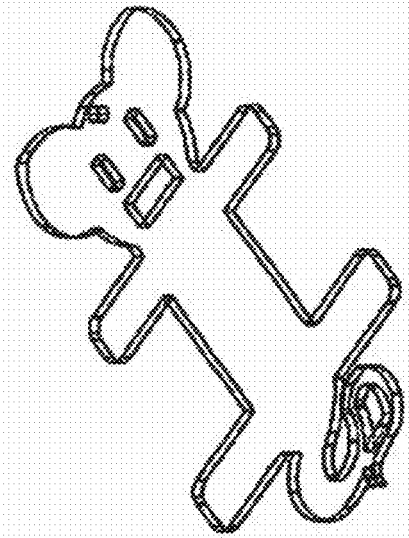
FIG. 8D

UNIVERSAL ELECTRONIC CABLE AND CORD ORGANIZATION, MANAGEMENT AND STORAGE DEVICE WITH MULTIPLE DESIGN CONFIGURATIONS AND PERMUTATIONS

RELATED APPLICATIONS

This application is related to and claims benefit of priority of U.S. Provisional Patent Application Ser. No. 62/231,621 filed Jul. 13, 2015, the contents of which are incorporated herein by reference in its entirety.

TECHNICAL FIELD

The present disclosure relates to the field of cable and cord organizers and more particularly to a portable cable and cord organization, management and storage device.

BACKGROUND OF THE INVENTION

According to Pew Research Center, 90% of people have a mobile device in reach 100% of the time. The growth in mobile device usage, related charger cables and cords has increased drastically over the last decade to the point that it has become an integral part of both business and personal life. Additionally, Common Sense Media reports that 38% of two-year olds use mobile devices. The facts show that folks of all ages are using mobile devices with more and more frequency.

Consequently, charging, storing and managing mobile devices and their related components have become part of people's daily life routine. Accordingly, managing numerous electronic cables/cords of varying sizes and lengths has become an organizational problem, especially when carrying cables/cords in transit. Typically, these cables/cords are either stored in a carry bag or in a pocket of a user. This is undesirable for at least three reasons. First, this type of storage causes the cables/cords to become tangled requiring that they be untangled for each use. Second, this causes damage to the cables/cords because the cables/cords typically have an acceptable bend radius beyond which the cable/cord will become damaged and/or structurally and operably degraded. Third, this causes the connections between the cords/cables and the corresponding connector ends to be damaged and weakened from being bent, thereby leading to a failure of the cable/cord.

SUMMARY OF THE INVENTION

The present invention includes, at least, cable and cord organizers and managing device more particularly to a wall plug plate configured to secure an electrical cable/cord plugged into the wall.

In one embodiment, the present disclosure provides a single unit cord management device 100 having a shape representing an animal and/or cartoon figure for a cord, comprising: a first section 102 representing the head of the animal and/or cartoon figure, comprising two top portion second openings 118 capable of receiving two pins or prongs of a 2-pronged or 3-pronged electrical source plug and a top portion third opening 120 capable of receiving a USB plug or a pin or prong of a 3-pronged electrical source plug, wherein the two top portion second openings 118 represent the eyes of the animal and/or cartoon figure and the top portion third opening 120 represents the mouth of the animal and/or cartoon figure; a third section 106 representing the tail of the animal and/or cartoon figure, comprising a curvilinear structure 134; and a second section 104 connecting the first section 102 and the third section 106 and representing the body of the animal and/or cartoon figure, comprising a second section middle portion 124 representing the trunk of the animal and/or cartoon figure and a plurality of second section top protrusions 130 and/or second section bottom protrusions 132 representing the limbs of the animal and/or cartoon figure, wherein at least one end of the cord carries a plug selected from the group consisting of: a 2-pronged electrical source plug, a 3-pronged electrical source plug, and a USB plug, wherein the body of the cord may be wrapped around the second section 104 and at least one end of the cord may be secured by the first section 102 or the third section 106.

In other embodiments, in the single unit cord management device described herein, at least one of the first section 102 or the second section 104 is symmetric about their midline axis. In other embodiments, the two top portion second openings 118 of the first section 102 are arranged symmetric to each other about the midline axis of the first section 102. In one embodiment, the two top portion second openings 118 of the first section 102 have a rectangular shape of a same size. In another embodiment, the top portion third opening 120 of the first section 102 has a rectangular shape with the longer sides centered horizontally and symmetrically across the midline axis of the first section 102.

In one embodiment, the top portion third opening 120 of the first section 102 has a rectangular shape with the shorter side centered horizontally and symmetrically across the midline axis of the first section 102. In another embodiment, at least one second section top protrusion 130 represents the front legs of the animal and/or cartoon figure and is the same size as at least one second section bottom protrusion 132. In another embodiment, at least one second section bottom protrusion 132 represents the hind legs of the animal and/or cartoon figure and is of the same size as at least one second section top protrusion 130. In one embodiment, at least one of second section top protrusion 130 representing the front legs of the animal and/or cartoon figure are shorter in size than at least one of second section bottom protrusion 132 representing the hind legs of the animal and/or cartoon figure.

In some embodiments, the at least one of the first section 102, the second section 104, and the third section 106 is made of plastic, metals, or other materials. In one embodiment, the at least one of the first section 102, the second section 104, and the third section 106 is made of plastic.

A cord management device is provided and includes a shape representing an animal and/or cartoon figure. The cord management device includes a first section, wherein the first section is configured to resemble the head of the animal and/or cartoon figure and includes two top portion second openings configured to receive one or more blades of an electrical plug and a top portion third opening configured to receive at least one of a USB plug and a blade of the electrical plug, wherein the two top portion second openings are located to represent eyes of the animal and/or cartoon figure and the top portion third opening is located to represent a mouth of the animal and/or cartoon figure. A third section is provided and includes a curvilinear structure, wherein the curvilinear structure is shaped to represent a tail of the animal and/or cartoon figure. A second section is provided and located between the first section and the third section, wherein the second section includes one or more second section top protrusions and/or one or more bottom protrusions, wherein the second section is configured to represent the body of the animal and/or cartoon figure.

BRIEF DESCRIPTION OF THE DRAWINGS

The foregoing and other features and advantages of the present invention will be more fully understood from the following detailed description of illustrative embodiments, taken in conjunction with the accompanying drawings in which like elements are numbered alike:

FIG. 1A is a front view of a cord management device 100 according to one embodiment of the invention.

FIG. 3A illustrates a front view of a cord management device according to one embodiment of the invention.

FIG. 3B illustrates a front view of a cord management device according to another embodiment of the invention.

FIG. 5A illustrates a front view of a cord management device according to one embodiment of the invention.

FIG. 5B illustrates a front view of a cord management device according to another embodiment of the invention.

FIG. 6A illustrates a front view of the cord management device of FIG. 5A.

FIG. 6B illustrates a side view of the cord management device of FIG. 5A.

FIG. 6C illustrates a top down view of the cord management device of FIG. 5A.

FIG. 6D illustrates a side top-down isometric view of the cord management device of FIG. 5A.

FIG. 7A illustrates a front view of a cord management device according to one embodiment of the invention.

FIG. 7B illustrates a front view of a cord management device according to another embodiment of the invention.

FIG. 8A illustrates a front view of the cord management device of FIG. 7A.

FIG. 8B illustrates a side view of the cord management device of FIG. 7A.

FIG. 8C illustrates a top down view of the cord management device of FIG. 7A.

FIG. 8D illustrates a side top-down isometric view of the cord management device of FIG. 7A.

DETAILED DESCRIPTION OF THE INVENTION

The use of portable music players, cell phones, and other portable electronic equipment has increased dramatically in recent years. Many such devices include parts such as headphones, recharging cables, microphones, and the like, which are connected to the portable electronic device by a cord or cords. The present invention is a stand-alone article to organize, manage and store cables/cords for portable or non-portable electronic devices and small appliances, e.g., cell phone recharging cords, camera to computer connection cables, Universal Serial Bus (USB) cables, headphone cables, etc.

It should be appreciated that the term "cord," "cable," "wire," "thread," or other similar terms are interchangeably used in the present description to refer to any cord that can be used with the cord management device provided herein. The "any cord" includes, but is not limited to, any electrical or electronic cord or any non-electronic or non-electrical cord. The cord provided herein may comprise at least two ends, which may be the form of an electronic device or appliance (e.g., ear buds of an earphone cord), an adapter or connector to an electronic device or appliance (e.g., a USB plug or a USB receptacle, or a jack or pin of an earphone cord), an electrical source plug or power plug (e.g., a power plug for an AC/DC adapter or converter, or a USB plug), an adapter or connector to an electrical source plug or power plug (e.g., a USB plug to an AC/DC adapter or converter having a USB receptacle), or combinations thereof.

Figure 1B:
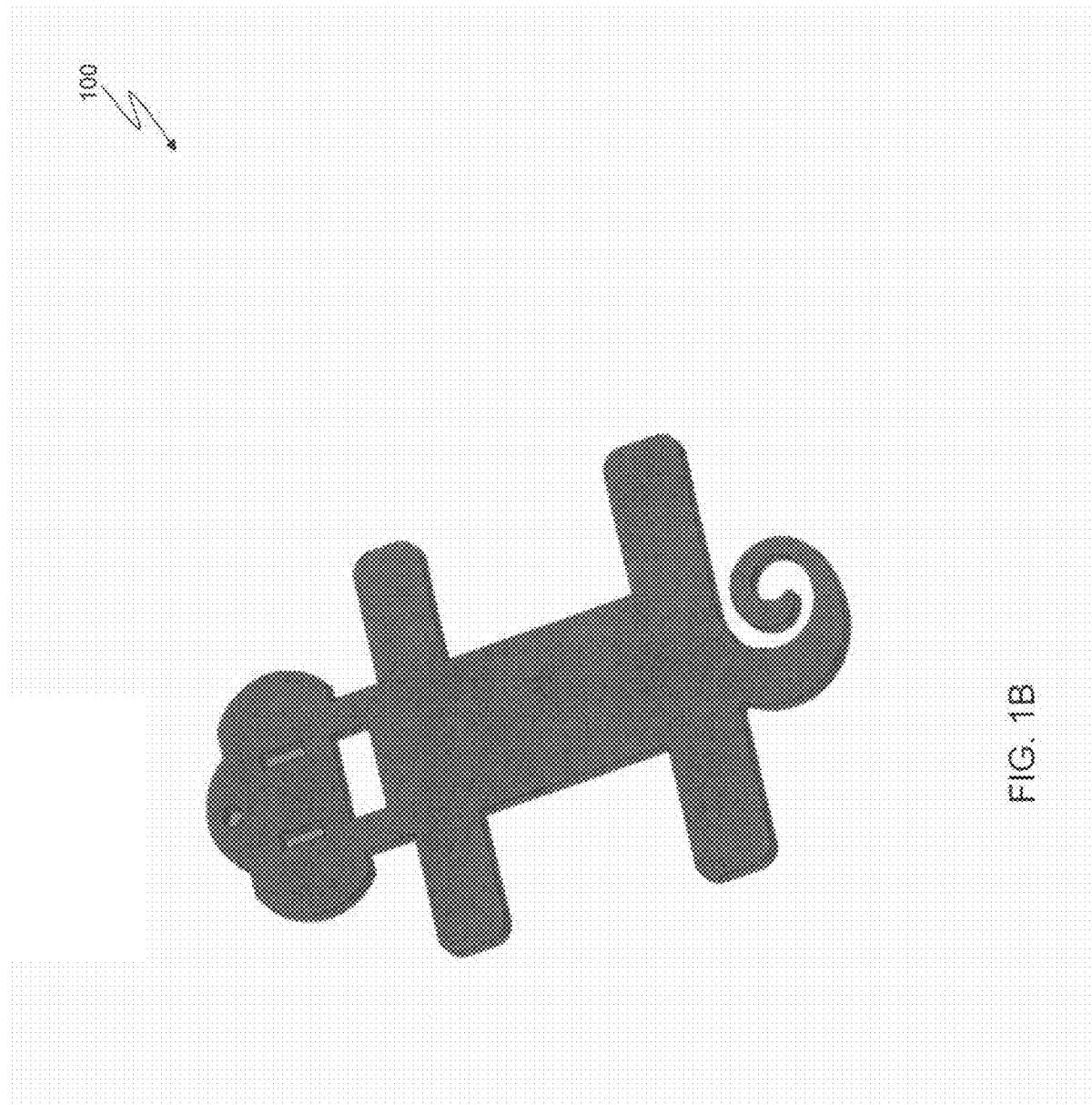
FIG. 1B is a top down front view of the cord management device 100 of FIG. 1A.

Briefly referring to FIG. 1A and FIG. 1B, a cord management device 100 is provided in accordance with one embodiment, wherein the cord management device 100 includes a top section 102, a mid-unit section 104, and a bottom section 106. It should be appreciated that the top section 102, mid-unit section 104 and bottom section 106 may have variable design components and permutations. Components and permutations do not alter the engineered attributes for function but will allow for aesthetic and form changes while maintaining the integrity of the engineered characteristics.

It should be appreciated that the overall design of the cord management device 100 is shaped to resemble an animal or other figure, including an artistic rendering of a "head" (represented by top section 102), a "body with four (4) legs" (represented by mid-unit section 104), and a "tail" (represented by bottom section 106). Referring to FIG. 3-FIG. 8, although only four animal configurations (i.e., cat, dog, monkey, and mouse) are represented herein, it is contemplated that the cord management device 100 may be shaped as any form representing any tailed animal or other figure or shape desired, such as that in a cartoon or artistic format. Due to the large number of possible shape configurations, only four potential design perspectives are shown herein.

As briefly discussed herein above, referring again to FIG. 1A, one embodiment of a cord management device 100 is shown and includes a first section 102, a second section 104, and a third section 106. The first section 102 includes a first section top portion 108, a first section middle portion 110 and a first section bottom portion 112 and is configured to resemble a predefined shape, such as that of the head of an animal and/or cartoon figure. The first section 102 includes a top portion first opening 116 located proximate the first section top portion 108, wherein the top portion first opening 116 is configured to receive and contain a phone connector plug (i.e. phone jack, audio jack, jack plug . . . etc.), such as a TS, TRS and/or TRRS connector plug. The top portion first opening 116 is preferably sized and shaped to receive and snugly contain the phone connector plug. The first section 102 further defines a plurality of top portion second openings 118 located proximate the first section middle portion 110, wherein the top portion second openings 118 are sized and shaped to receive and snugly contain the blades of an electrical plug. It is contemplated that in other embodiments, the first section 102 may include no top portion second opening 118 or the first section 102 may include one or more top portion second openings 118 as desired. Thus, it should be appreciated that the first section structure is not limited to a plurality of top portion second openings 118. In embodiments, in the cord management device described herein, at least one of the first section 102 and the second section 104 is symmetric about its midline axis, designated as A in FIG. 1A.

Figure 1C:
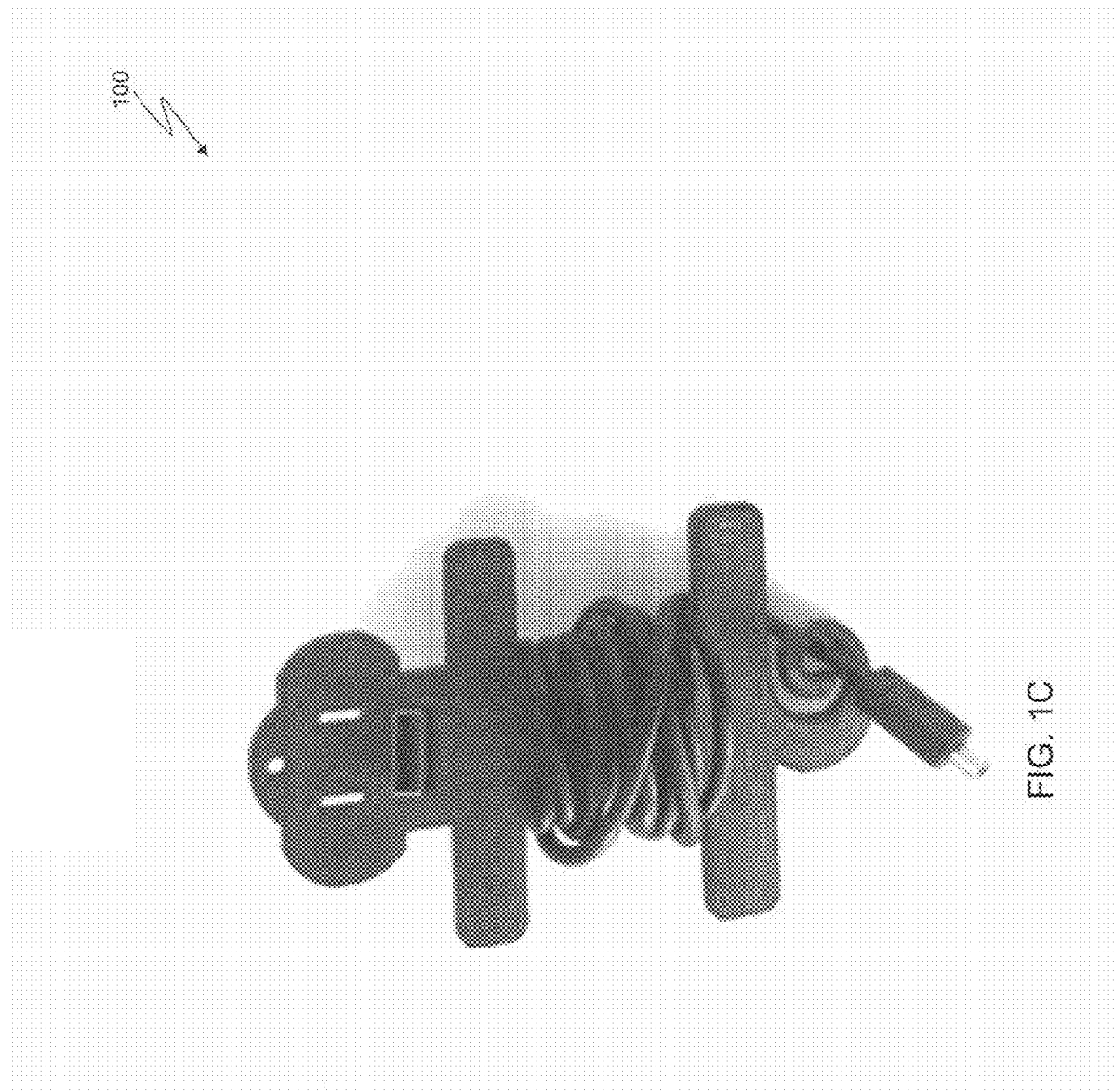
FIG. 1C is a front view of the cord management device 100 of FIG. 1A associated with a cord, in accordance with one embodiment of the invention.
Figure 1D:
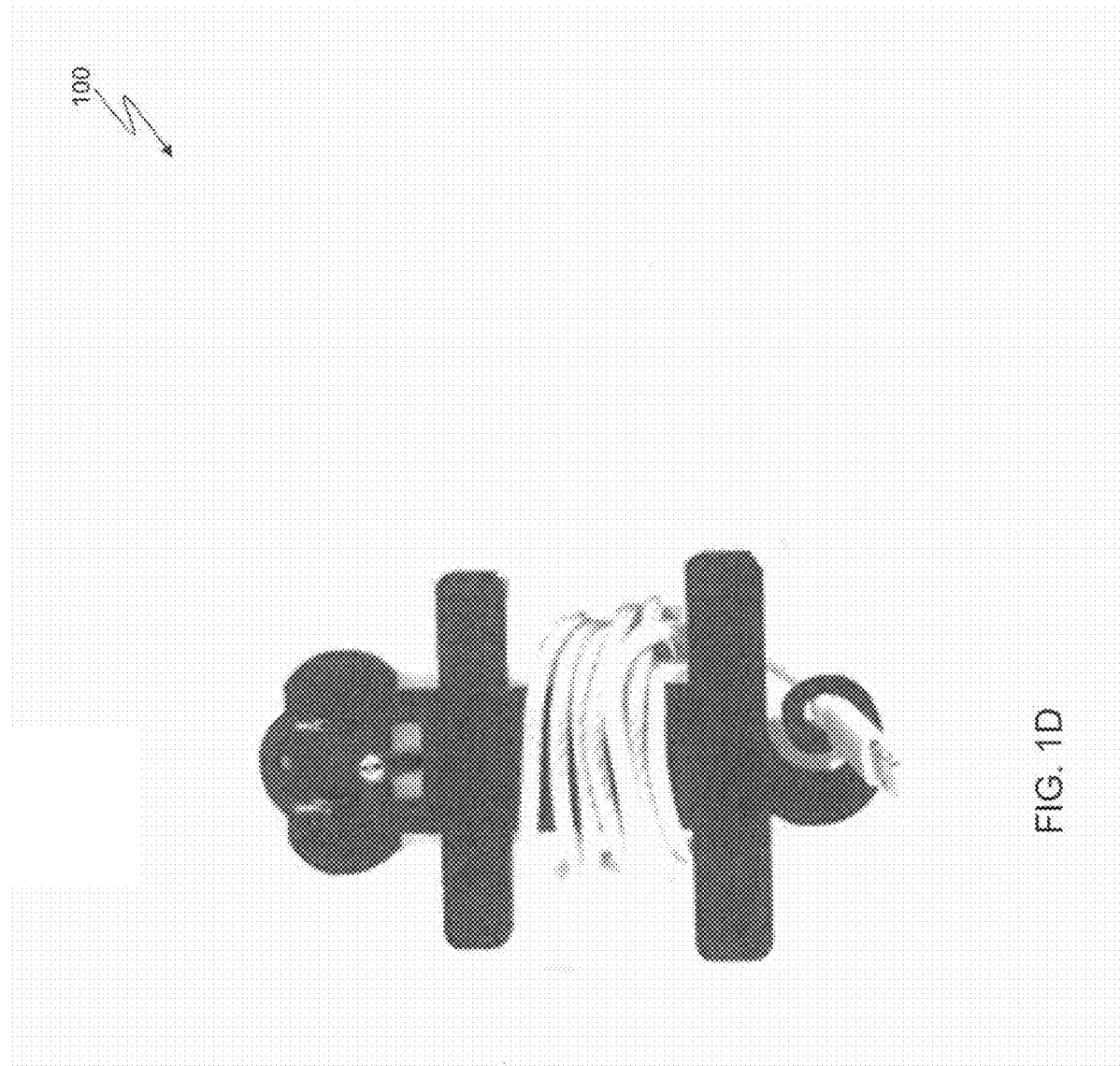
FIG. 1D is a front view of the cord management device 100 of FIG. 1A associated with a cord, in accordance with another embodiment of the invention.
Figure 1E:
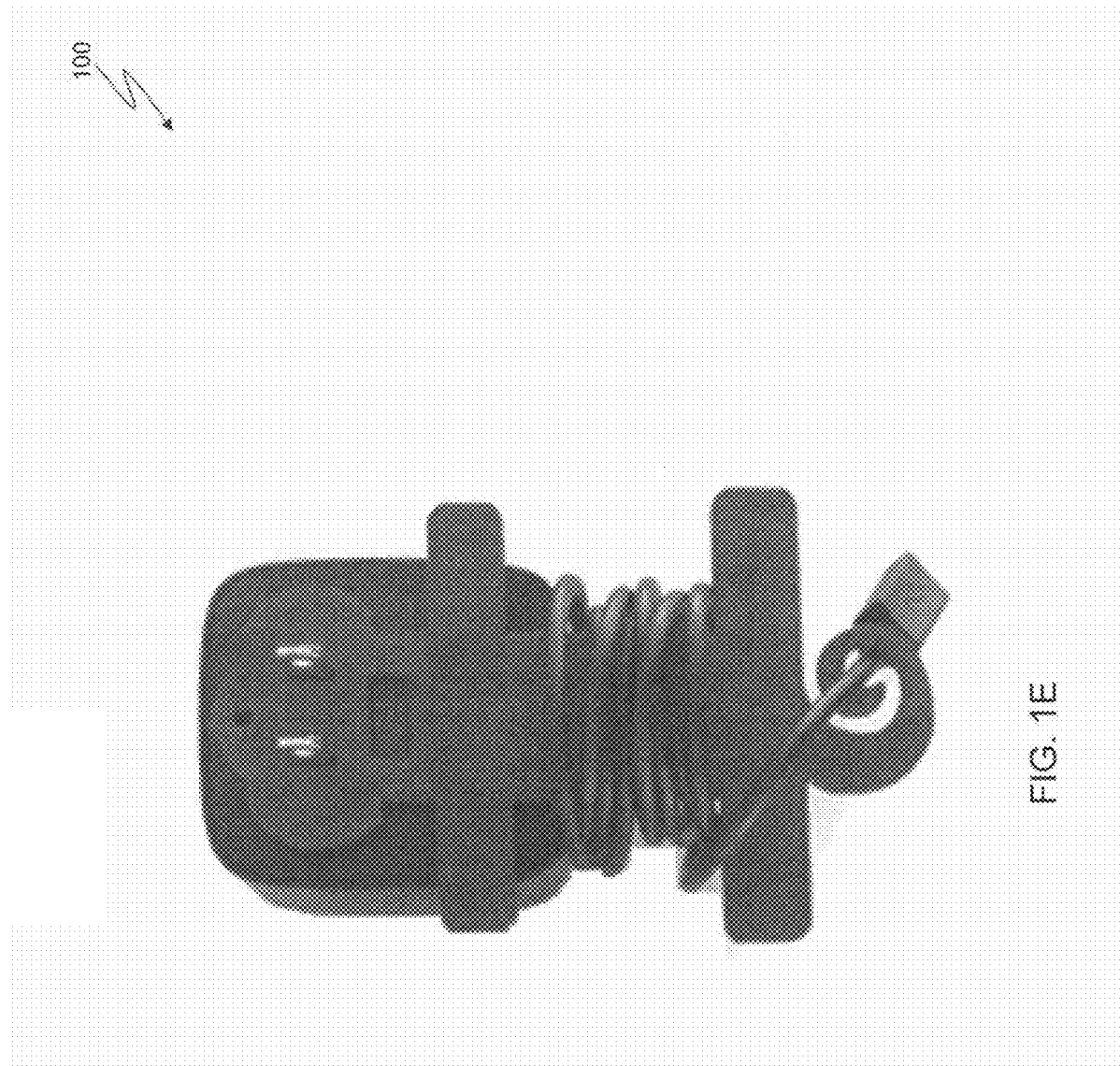
FIG. 1E is a front view of the cord management device 100 of FIG. 1A associated with a cord, in accordance with still yet another embodiment of the invention.

Moreover, the first section 102 further defines a top portion third opening 120 located proximate the first section bottom portion 112, wherein the top portion third opening 120 is sized and shaped to receive and snugly contain a USB connector. It is contemplated that in other embodiments, the first section 102 may include no top portion third opening 120 or the first section 102 may include one or more top portion third openings 120 as desired. Thus, it should be appreciated that the first section structure is not limited to only one top portion third opening 120. Accordingly, referring to FIG. 1C to FIG. 1E, the cord management device 100 is a standalone article for managing and storing cords having varying plug blade/connection configurations.

Figure 1F:
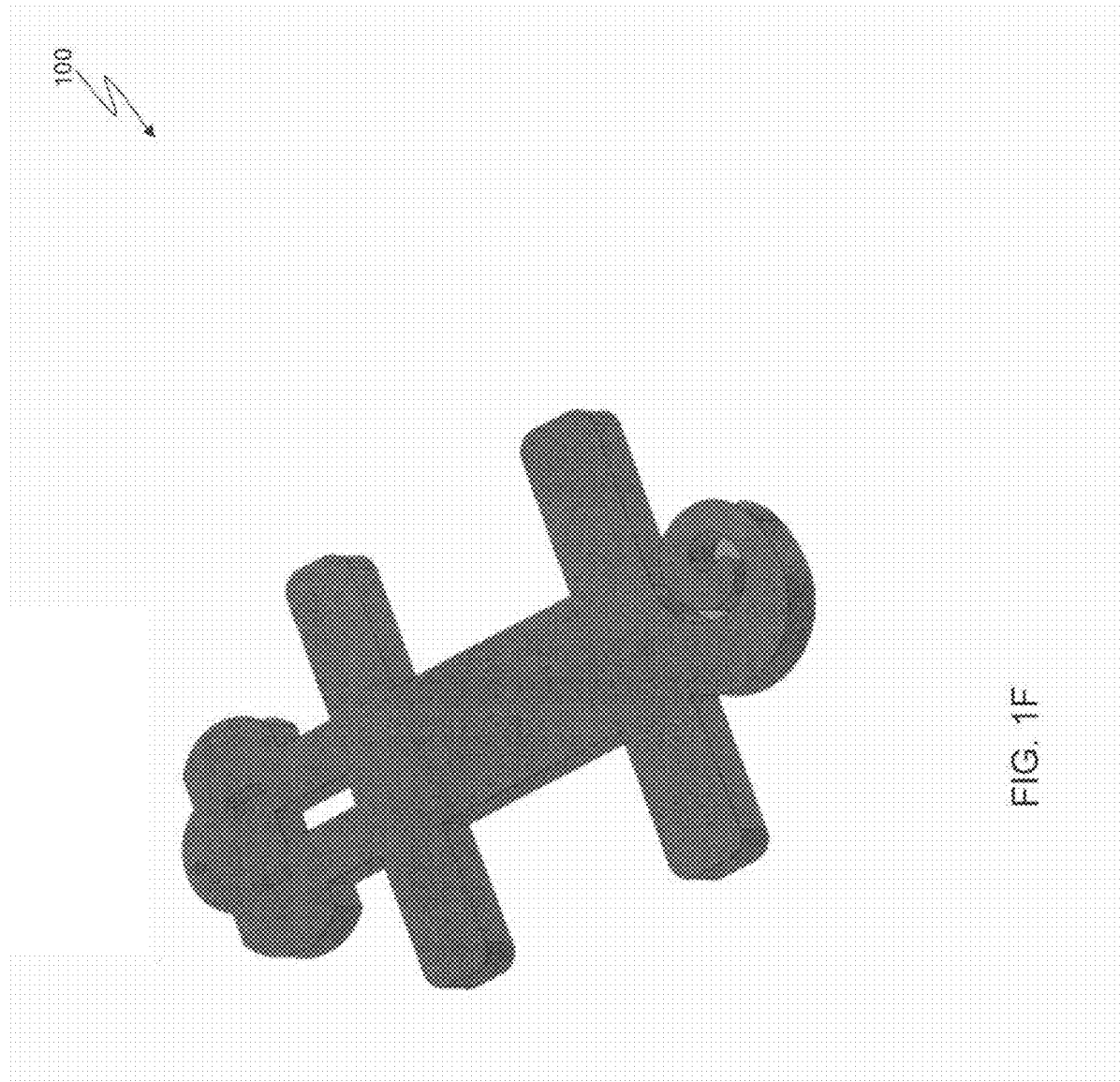
FIG. 1F is a top down front view of the cord management device 100 according to still yet another embodiment of the invention.
Figure 2A:
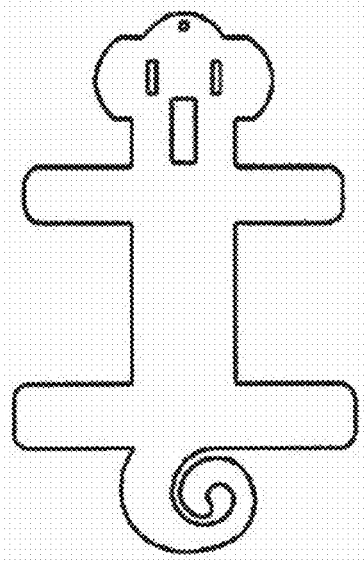
FIG. 2A illustrates a front view of the cord management device of FIG. 1A.
Figure 2B:
FIG. 2B illustrates a side view of the cord management device of FIG. 1A.
Figure 2C:
FIG. 2C illustrates a top down view of the cord management device of FIG. 1A.
Figure 2D:
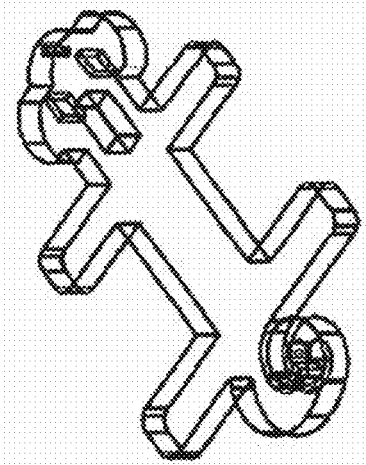
FIG. 2D illustrates a side top-down isometric view of the cord management device of FIG. 1A.
Figure 4A:
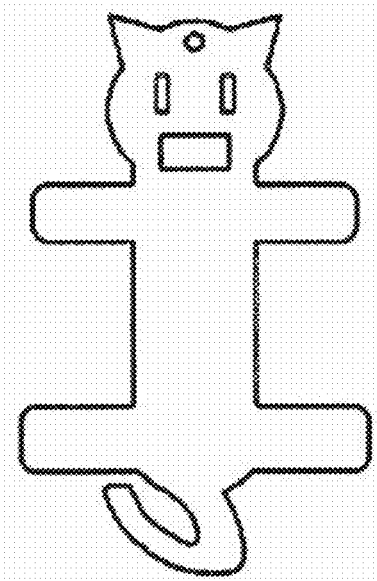
FIG. 4A illustrates a front view of the cord management device of FIG. 3A.
Figure 4B:
FIG. 4B illustrates a side view of the cord management device of FIG. 3A.
Figure 4C:
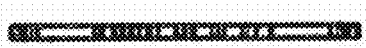
FIG. 4C illustrates a top down view of the cord management device of FIG. 3A.
Figure 4D:
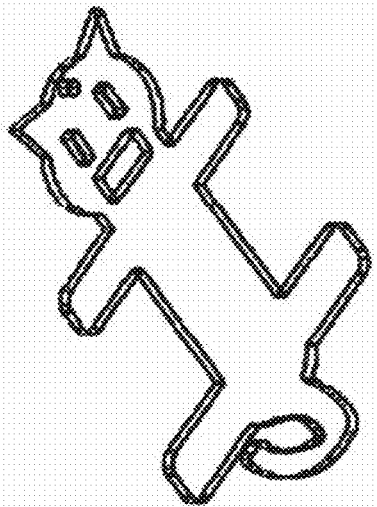
FIG. 4D illustrates a side top-down isometric view of the cord management device of FIG. 3A.

While not being limited to the exemplary design shown in FIG. 1A, the present invention also includes similar designs comprising similar but different Elements. For example, referring to FIG. 1F, the shapes of the top portion second openings 118 and the top portion third opening 120 may be changed to fit different blades, cord plugs or cords. For example, the top portion second opening 118 may be designed as circular, rather than rectangular as shown in FIG. 1A, holes to receive European style cord plugs. In addition, the top portion third opening 120 may be designed as a circular hole, rather than rectangular as in FIG. 1A, to receive a pin or prong of three-pronged cord plugs or power cords.

The second section 104 includes a second section top portion 122, a second section middle portion 124 and a second section bottom portion 126 and is configured to resemble a predefined shape, such as that of the body of an animal and/or cartoon figure. The second section 104 includes a plurality of top portion protrusions 130 located proximate the second section top portion 122, wherein the top portion protrusions 130 are sized and shaped to represent one or two or more "arms" of an animal and/or cartoon figure. It is contemplated that in other embodiments, the second section 104 may include no top portion protrusion 130 or the second section 104 may include one or more top portion protrusions 130 as desired. Thus, it should be appreciated that the second section structure is not limited to a plurality of top portion protrusions 130.

The second section 104 includes a second section middle portion 124, sized and shaped to represent the "body" of an animal and/or cartoon figure. The second section 104 further includes a plurality of bottom portion protrusions 132 located proximate the second section bottom portion 126, wherein the bottom portion protrusions 132 are sized and shaped to represent one or two or more "legs" of an animal and/or cartoon figure. It is contemplated that in other embodiments, the second section 104 may include one or more bottom portion protrusions 132 as desired. Thus, it should be appreciated that the second section structure is not limited to a plurality of bottom portion protrusions 132. In some embodiments, the power cable or cord, which is with the cord management device 100 by being "plugged into" top portion second openings 118 or the USB cable being plugged through top portion third opening 120, may be wound around the second section middle portion 124, or at least one of the second section top or bottom portion protrusions 130, 132. In an additional embodiment, at least one of second section top protrusions 130 and second section bottom protrusions 132 may be a three-sided rectangular projection with rounded edges, as shown in FIG. 1A.

The third section 106 includes a curvilinear element 134 (which may or may not be centered along the midline of the cord management device 100) and is configured to resemble a predefined shape, such as that of the tail of an animal and/or cartoon figure. It should be appreciated that the curvilinear element 134 defines a curvilinear channel 136 that is sized and shaped to contain a portion of the power cord to manage the power cord. It is contemplated that in additional embodiments, the size and shape of the curvilinear element 134 may vary as desired suitable for the desired end purpose and for different styles.

Once the electrical source plug or power cord (e.g., two-pronged, USB, or three-pronged) is plugged into (i.e. associated with) the first section 102 (e.g., the pins or prongs of the plug are protruding through at least one of top portion second openings 118 and top portion third openings 120), all or a portion of the remaining length of the cable or cord may be wound around the second ("middle") section 104 ("caddy"), between the top and bottom portion protrusions 130, 132 (i.e. "arms" and "legs"). The remaining end of the cable or cord is then located within the curvilinear channel 136 of the third section 106 (i.e. the "tail").

It should be appreciated that in other embodiments the first section 102, second section 104 and/or third section 106 may be configured to function with different types of electrical/data plug configurations. For example, in one embodiment the first section 102 may be configured to include at least one aperture of various shapes, e.g., a circle, a half-circle, a rectangle, a square, a polygon, a diamond, a star, an oval, a heart, etc., to allow connection with different types of electrical/data connectors. Additionally, in still another embodiment the first section 102 may be configured to omit one or more of the top portion first opening 116, top portion second openings 118 and top portion third openings 120 as desired. In still yet another embodiment, the top portion first opening 116 may be configured to interact with a string, a chain, a cord, or other materials which connect or fasten the single unit device provided herein to other objects (e.g., bags, key chains, key rings, belt key holders, belt loops, boxes, tool boxes, wall hangers, etc.). In another embodiment, the top portion first opening 116 may also be configured to receive the jack pin of earphones and/or other electronic device. It should be appreciated that the dimension of the top portion first opening 116 may be of any size and shape suitable to the desired end result.

It is contemplated that in one embodiment, the top portion second openings 118 may be two apertures of any shape or size as desired configured to receive and snugly contain an electrical blade or power cord plug (e.g., two-pronged plugs, three-pronged plugs, etc.) and may be sized and shaped responsive to the type of electrical/data plug. For example, the top portion second openings 118 may be shaped to operate with any electrical outlet plugs/blades, such as at least one of the fifteen types assigned as Type A to Type O by the U.S. Department of Commerce International Trade Administration (ITA) or other types used nationally or internationally. Additionally, as the cord management device 100 is designed to adopt the shape of an animal/cartoon character having a tail, the first section 102 may be designed to be the head of the animal and/or cartoon figure and the top portion second openings 118 are designed to represent the two eyes of the animal and/or cartoon figure.

It is also contemplated that the top portion third openings 120 may be an aperture of any shape or size suitable to the desired end purpose. Additionally, the shape and/or size of the top portion third openings 120 may be configured to be compatible with various types of plugs, such as USB plugs and/or a blade of a three-pronged electrical source plug and/or power cord plug. For example, in one embodiment, the top portion third openings 120 may include an aperture in the shape of a midline-centered rectangle with the long side centered horizontally (as shown in FIGS. 1A, 3A, 5A and 7A). In another embodiment, the top portion third openings 120 may be an aperture in shape of a midline-centered rectangle with the long side centered vertically (as shown in FIGS. 3B, 5B, and 7B). In still yet other embodiments, the top portion third openings 120 may be a rectangle or circular aperture to receive a pin or prong of a three-pronged electrical source plug or power cord plug (e.g., the earth pin of a Type B plug). Additionally, various other shapes may be adopted for the top portion third openings 120 to receive any USB plugs currently used, such as, USB 2.0 Type A, USB 2.0 Type B, USB 2.0 Mini Type B 4 Position, USB 2.0 Mini Type B 5 Position, USB 2.0 Micro B, USB 3.0 Type A, USB 3.0 Type B, USB 3.0 Micro Type B, etc. As the cord management device 100 provided herein is designed to adopt a shape of an animal and/or cartoon figure with arms and/or legs and a tail, the top portion third openings 120 may be designed to represent the mouth of the animal and/or cartoon figure.

Figure 9:
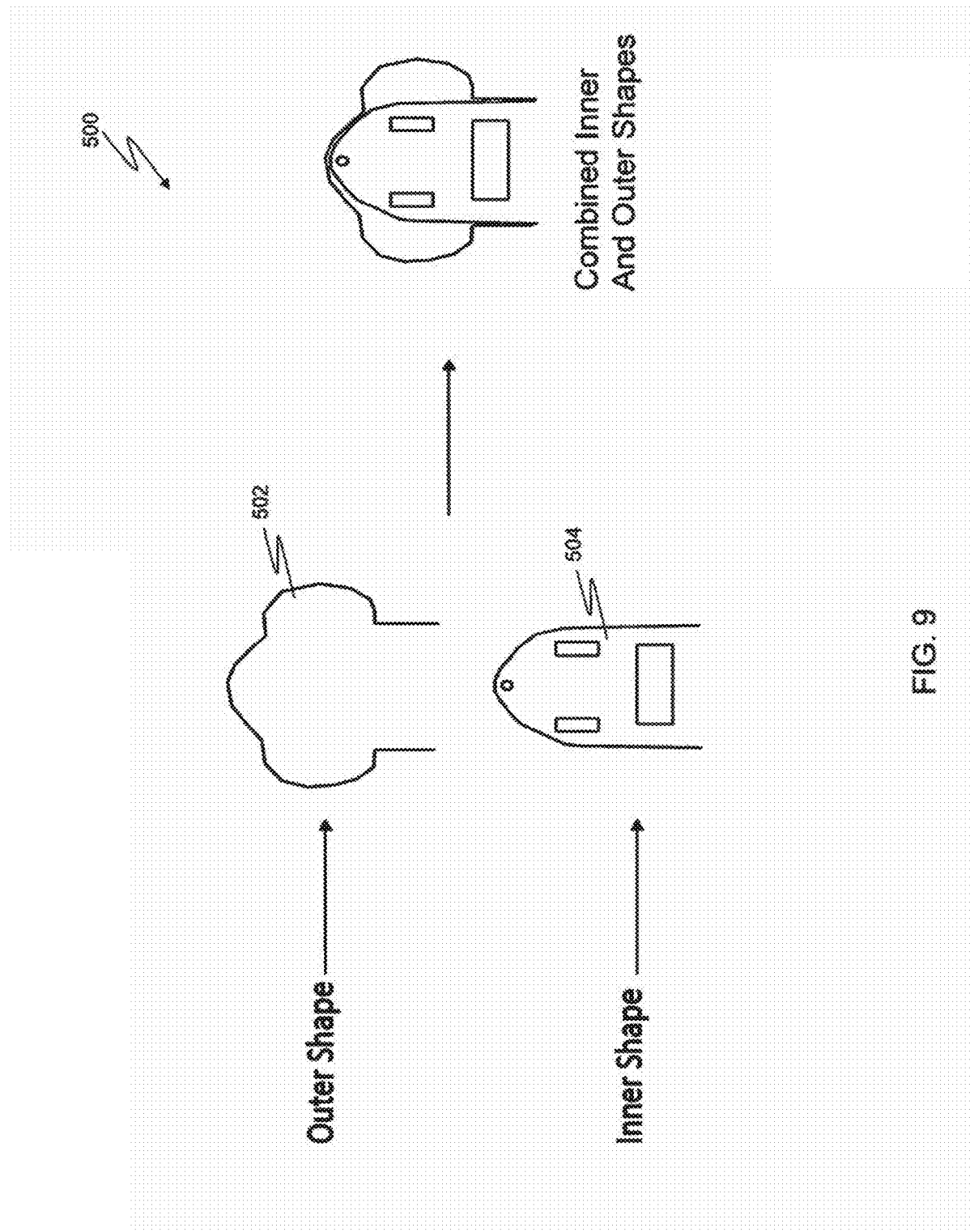
FIG. 9 illustrates a front view of the top part of a cord management device according to one embodiment of the invention. Such top part of the cord management device comprises two separable parts: the outer part (labeled as "outer shape") and the inner part (labeled as "inner shape").

In accordance with still yet another embodiment 500 of the invention, the first section 102 may resemble the head of an animal and/or cartoon figure, wherein, the first section 102 may be constructed as a removable section. For example, the first section 102 may include two sections (i.e., an outer section and an inner section) which may be combined together to form the first section 102. For example, as shown in FIG. 9, an outer shape 502 may slide over an inner shape 504, wherein the outer shape 502 and the inner shape 504 snugly engage with each other. In accordance with this embodiment, the outer shape 502 may represent the shape of the head of the animal and/or cartoon figure, while the inner shape 504 may contain all functional apertures or openings. Thus, different shapes of the head (e.g., monkey, dog, cat, mouse, etc.) may be interchangeable onto a single inner shape 504.

As above, the second section 104 generally represents the body of the animal and/or cartoon figure. The top portion protrusions 130, as in FIG. 1A, are designed to represent the two front legs (or arms) of the animal, while the bottom portion protrusions 132 represent the two hind legs (or legs) of the animal. The top portion protrusions 130 and/or bottom portion protrusions 132 may have different shapes or sizes as desired. For example, in one embodiment, the top portion protrusions 130 may have similar sizes, while the bottom portion protrusions 132 have another size which may be longer/shorter (and or wider/thinner) than that of the top portion protrusions 130 (See FIG. 1A), representing an animal (e.g., a monkey as in FIG. 1A) having hind legs (or legs) that are longer than the front legs (or arms). Additionally, the top portion protrusions 130 may be longer than the bottom portion protrusions 132 to represent other animals (e.g., gorillas) having longer front legs (or arms) than hind legs (or legs). The shape or textile of the top portion protrusions 130 and/or the bottom portion protrusions 132 may also be variable, representing different animals or different art styles depicting animals. For example, paws, claws, or fingers may be designed at the end of the projections and the represented "arms" or "legs" may be not in the straight position as in FIG. 1A. The functions of the top portion protrusions 130 and/or the bottom portion protrusions 132 may be variable. For example, the body of a cable, cord, or other threads may be wrapped around at least one of these components. In addition, these components may be used to hold the whole single unit device provided herein, and/or used only for decoration purposes.

Additionally, the second section middle portion 124 is generally designed to represent the body (or trunk) of the animal and/or cartoon figure. In one embodiment, as shown in FIG. 1A, the second section middle portion 124 is a rectangular shaped center of the second section 104, connecting the first section 102 and the third section 106, as well as the top portion protrusions 130 and/or the bottom portion protrusions 132. The body of a cable/cord may be wrapped around the second section middle portion 124 as a storage or management method, resulting in occupying less storage room. The shape or textile of the second section middle portion 124 may be variable, representing different animals or different art styles depicting animals and/or cartoon figures. For example, grooves or notches may be included on the second section middle portion 124 to facilitate the wrapping of a cable/cord around the second section middle portion 124. In addition, various materials may be used to make the second section middle portion 124 to represent, e.g., the unique fur, feather, or skin of the animal and/or cartoon figure.

Moreover, the third section 106 is designed to represent the tail of the animal and/or cartoon figure. Correspondingly, the third section 106 may have any size or shape suitable to the desired end purpose, such as having a curvilinear structure 134 having an opening to aid in securing the end of the cable, cord, or other threads wrapped around the second section 104 (e.g., around the second section middle portion 124). Different designs of the curvilinear structure 134 include but are not limited to those ones illustrated in FIGS. 1A, 3A, 5A, and 7A. A cable/cord of an electronic device or appliance may be wrapped around the second section 104 and one end of cord/cable may be secured, through the curvilinear structure 134. When first section 102, second section 104, and third section 106 of the cord management device 100 provided herein are fully engaged, the electronic cable/cord, or other threads are organized, managed, and secured for storage.

It should be appreciated that the cord management device 100 may be constructed from any material or combination of materials suitable to the desired end purpose, such as, for example, metal, wood, plastic, paper, glass, ceramic, and/or other inorganic or organic materials. For example, in one embodiment one or more different types of metal may be used to make the cord management device 100, such as iron, steel, stainless steel, aluminum, gold, silver, copper, nickel, platinum, tin, zinc, or combinations thereof, including, e.g., alloys (such as brass, bronze, chromoly, Titanium, etc.). Additionally, in another embodiment the cord management device 100 may be constructed from a plastic material, such as for example, thermoset (or thermosetting) plastics or thermoplastics, or combinations thereof, polyethylene terephthalate (PET or PETE), polystyrene (Styrofoam), polyvinyl chloride (PVC), polytetrafluoroethylene (Teflon), polyvinylidene chloride (Saran), polyethylene, low-density polyethylene (LDPE) and high-density polyethylene (HDPE) and polypropylene (PP).

It should also be appreciated that the dimension or size of the cord management device 100 may be variable, and/or may be dependent upon its desired use. For example, referring to FIG. 6A, in one embodiment, the cord management device 100 may have a total length L and a radius R of the third section of the single unit device as shown.

It should be further appreciated that although four types of design embodiments (monkey, cat, dog and mouse) are provided herein, the cord management device 100 may be configured to resemble various other types of animals and/or cartoon characters, as desired. As such, the top section 102, mid-unit section 104, and/or bottom section 106 may be configured to resemble various other types of animals and/or cartoon characters, for example, having different head shapes, tail shapes and/or mouth shapes.

It should be appreciated that while the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Moreover, it is contemplated that elements of one embodiment may be combined with elements of other embodiments as desired. Therefore, it is intended that the invention not be limited to a particular embodiment disclosed herein as the best mode contemplated for carrying out this invention, but that the invention will include all embodiments (individually and/or combined) falling within the scope of the appended claims and/or information. Moreover, unless specifically stated any use of the terms first, second, etc. do not denote any order or importance, but rather the terms first, second, etc. are used to distinguish one element from another.

What is claimed is:

1. A cord management device comprising:
a first section including two top portion second openings configured to individually receive and securely contain first and second blades of an electrical plug and a top portion third opening configured to receive and securely contain a USB plug, the first section having a thickness that is not greater than the length of an exposed metal portion of the USB plug,
a third section including a structure configured to retain an end portion of an electrical cord; and
a second section located between the first section and the third section, wherein the second section includes one or more second section top protrusions and one or more second section bottom protrusions configured to support and confine an elongated, wrapped electrical cord.

2. The cord management device of claim 1, wherein the top portion third opening of the first section has a rectangular shape with the longer sides centered horizontally and symmetrically across a midline axis of the first section.

3. The cord management device of claim 1, wherein the top portion third opening of the first section has a rectangular shape with the shorter sides centered horizontally and symmetrically across a midline axis of the first section.

4. The cord management device of claim 1, wherein at least one of the first section, the second section, and the third section is made of plastic.

5. The cord management device of claim 1, wherein the first section third opening is used to contain a third prong of the electrical plug.

6. The cord management device of claim 1, wherein the top portion third opening is configured to receive and securely contain at least one of a USB 2.0, USB 3.0, USB 2.0 Mini, USB 2.0 Micro, and USB 3.0 Micro plug.

* * * * *